United States Patent

Larimore et al.

Patent Number: 5,964,559
Date of Patent: Oct. 12, 1999

[54] ATTACHMENT BOLT LOCKING ASSEMBLY

[75] Inventors: Stephen W. Larimore; Kenny J. Hanzlick, both of Tucson, Ariz.

[73] Assignee: Raytheon Company, Lexington, Mass.

[21] Appl. No.: 08/975,778

[22] Filed: Nov. 21, 1997

[51] Int. Cl.[6] .................................... F16B 39/10
[52] U.S. Cl. ........................................ 411/120; 411/121
[58] Field of Search ................................ 411/119, 120, 411/121, 110, 191–194, 197, 198, 402; 81/180.1

[56] References Cited

U.S. PATENT DOCUMENTS

| | | | |
|---|---|---|---|
| 4,976,576 | 12/1990 | Mahaney | 411/121 |
| 5,304,021 | 4/1994 | Oliver | 411/121 |
| 5,746,558 | 5/1998 | Nygren | 411/121 |

*Primary Examiner*—Flemming Saether
*Attorney, Agent, or Firm*—David W. Collins; Andrew J. Rudd; Glenn H. Lenzen, Jr.

[57] ABSTRACT

A locking assembly that mechanically locks an attachment bolt, such as one used to secure a missile launcher to an aircraft, for example, thus preventing the bolt from vibrating loose as a result of vibration experienced during flight. The locking assembly has a spring loaded locking nut that mechanically engages a hex head of an extension shaft that is coupled to the attachment bolt. Transverse pins permit axial movement of the locking nut but prevent rotation thereof. A socket is used to push the locking nut away from the hex head of the extension shaft, so that the attachment bolt can be loosened or tightened. When the socket is removed, a spring pushes the locking nut over the hex head of the extension shaft, locking the attachment bolt and preventing it from turning.

6 Claims, 3 Drawing Sheets

ATTACHMENT BOLT LOCKING ASSEMBLY

BACKGROUND

The present invention relates generally to missile launchers, and more particularly, to an improved launcher attachment bolt locking assembly for use with missile launchers.

To prevent a bolt or nut from loosening during vibration one of the following methods is typically used.

A locking element, such as a Ny-Lock or Vespel type locking element, for example, is placed in threads of the bolt or nut to provide resistance from loosening. The disadvantages of this type of locking element are that it is only good for 10–15 installations and removals, and there is no positive indication that such locking elements are functioning.

A sealant such as Locktite sealant, for example, is placed on the threads prior to assembly to prevent loosening. The disadvantages using sealant is that when the bolt or nut is replaced, the threads must be resealed during each installation.

A mechanical lock, such as a lockwire or a cotter pin, for example, is placed through a hole in the bolt or nut, or in some cases through both the bolt and the nut to mechanically lock them to prevent rotation. The disadvantage to using mechanical locking elements is the time and effort required to remove the lockwire or cotter pin before removal of the bolt or nut. The lockwire or cotter pin also must be reinstalled when the bolt or nut is reinstalled.

None of the above conventional techniques provide both a visually verifiable mechanical lock and the ease of frequent installation and removal of the nut or bolt. Furthermore, the operating life of the currently used locking element is too short and there is no indication or means to verify when this locking element is worn out.

With specific regard to missile launcher applications, AMRAAM LAU-129 launchers and other similar launchers manufactured by the assignee of the present invention use attachment bolts and locking elements that are inserted into threaded holes. A pre-load torque is applied to the bolts to prevent the bolts from loosening during flight. The material from which the conventional locking elements are made is typically a heavy-duty nylon plastic material (such as those made by Ny-Lock or Vespel, for example). The conventional locking elements must be replaced after 10–15 installations. A user does not have a way to monitor the number of installations any one bolt has seen, and as a result, bolts with bad locking elements may be used.

Accordingly, it is an objective of the present invention to provide for an improved attachment bolt locking assembly. It is a further objective of the present invention to provide for an improved attachment bolt locking assembly that may be used with missile launchers, and other devices that experience vibration.

SUMMARY OF THE INVENTION

To accomplish the above and other objectives, the present invention provides for a locking assembly that mechanically locks an attachment bolt, such as one used to secure a missile launcher to an aircraft, for example, thus preventing the bolt from vibrating loose as a result of vibration experienced during flight. The locking assembly has a spring loaded locking nut that mechanically engages a hex head of an extension shaft coupled to the attachment bolt. One or more transverse pins permit axial movement of the locking nut but prevent its rotation.

When a standard socket is used to push the locking nut away from the hex head of the extension shaft, the attachment bolt can be loosened or tightened. When the socket is removed, a spring pushes the locking nut over the hex head of the extension shaft, locking the attachment bolt and preventing it from turning. The locking assembly works with existing attachment bolts used on missile launchers, such as those manufactured by the assignee of the present invention. The locking assembly allows the use of common hand tools for installation and removal of the attachment bolts.

The locking assembly mechanically locks the attachment bolt, thus preventing it from coming loose during flight as a result of vibration. The locking assembly uses a mechanical locking device that is visually verifiable. The locking assembly allows hundreds of installations and removals without degradation of its ability to lock the attachment bolt. The locking assembly also provides a visual indication that the attachment bolt is fully engaged and properly installed.

The present invention is particularly designed for use with an AMRAAM launcher and replaces currently employed locking elements used therein. The locking element of the present invention has both a long life and its locking capability is visually verifiable.

The launcher attachment bolt locking assembly was specifically designed for use with an AMRAAM LAU-129 launcher. However, the present invention may be adapted to other applications where prevention of bolt or nut loosening is critical and installation and removal is frequent, such as automobile lug nuts, for example.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
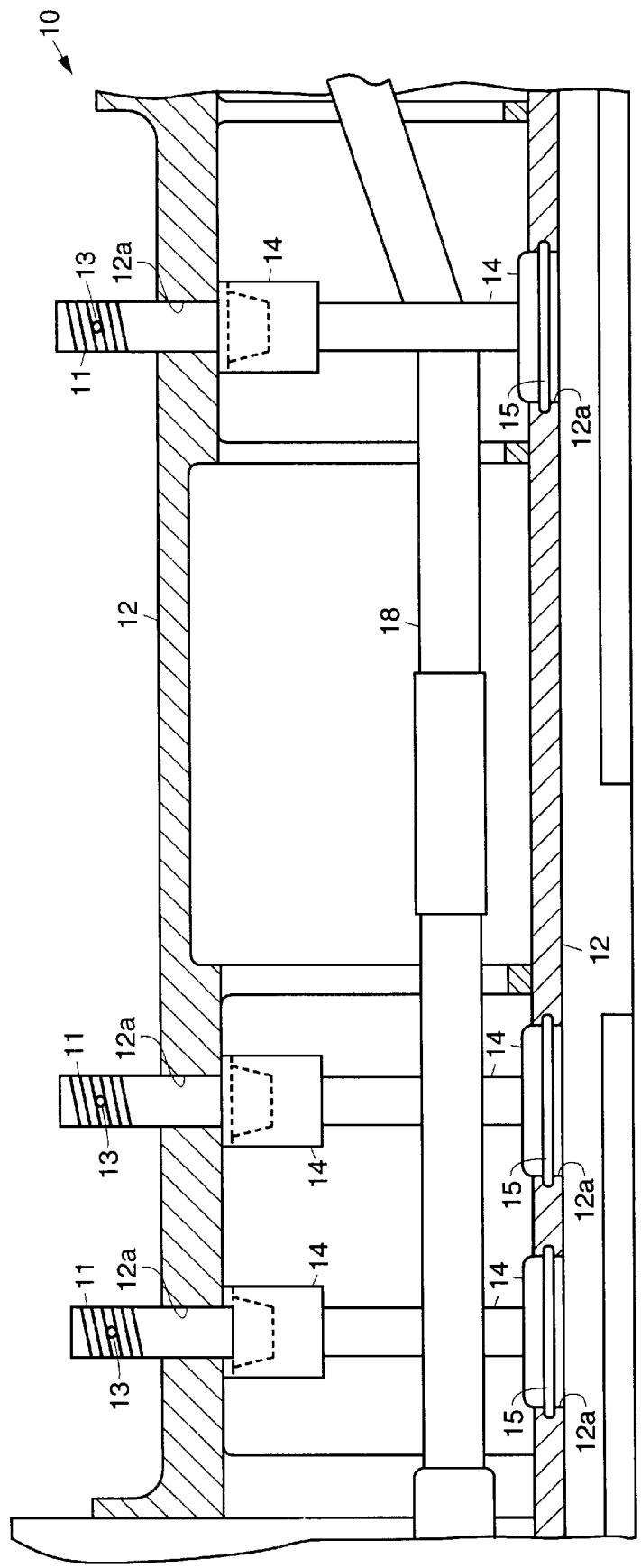
FIG. 1 illustrates a missile launcher employing conventional launcher attachment bolts and retaining mechanisms.
Figure 1A:
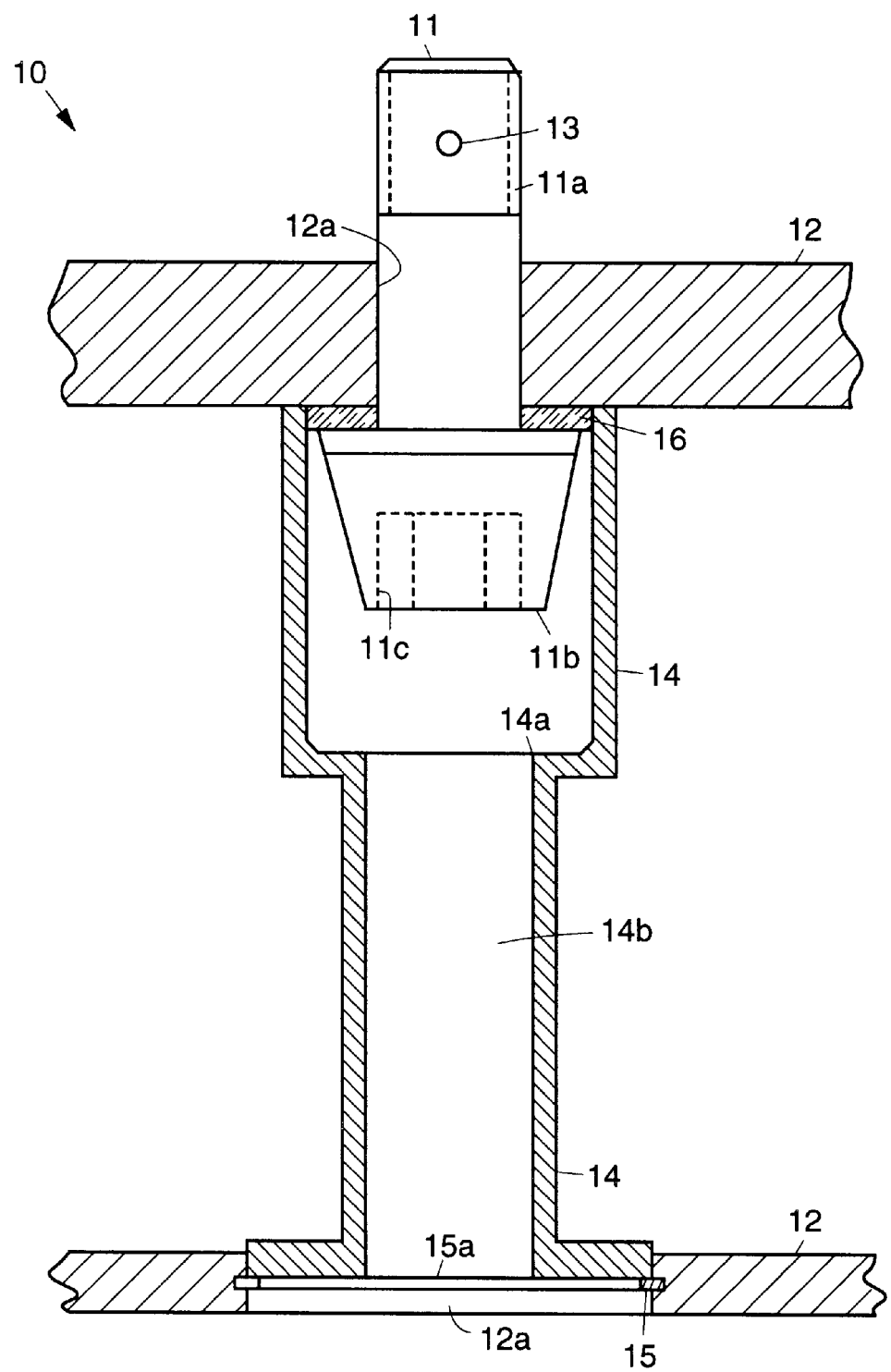
FIG. 1a illustrates details of the conventional launcher attachment bolt and its retaining mechanism used in the launcher of FIG. 1.

Referring to the drawing figures, FIG. 1 is a partial cross sectional view that illustrates conventional attachment bolts 11 and retainer 14 used to secure a typical missile launcher 10, such as a LAU-129 launcher 10 manufactured by the assignee of the present invention. The launcher 10 comprises a launcher rail 12 having holes 12a therein through which a plurality of attachment bolts 11 are disposed. Each of the attachment bolts 11 is retained by means of a bolt retainer 14 held in place by a retaining clip 15. FIG. 1a illustrates details of the attachment bolt 11 and its retaining mechanism used in the launcher of FIG. 1, and in particular, the attachment bolt 11 and retaining mechanism currently used in the LAU-129 launcher 10 manufactured by the assignee of the present invention. Conventional locking elements 13 are employed to secure the locking bolts 11, as will be discussed below. For the purposes of completeness, FIG. 1 also shows a wire harness 18 that runs laterally through the missile launcher 10.

Referring to FIG. 1a, the currently used LAU-129 launcher attachment bolt 11 is locked and retained in the LAU-129 launcher 10 when the launcher 10 is not disposed on an aircraft. In operation, when a new bolt 11 is installed in the LAU-129 launcher 10, the following procedure is used. A washer 16 is placed on the attachment bolt 11. The bolt 11 is then placed in position by reaching through a hole 12a at the bottom of the launcher 10 and sticking it through a bolt hole 12a in the top of the launcher 10. The head 11b of the attachment bolt 11 is against the bottom of the top surface of the launcher 10.

An aluminum tube shaped piece 14, known as a bolt retainer 14 is then placed through the hole 12a in the bottom of the launcher 10, and is positioned as shown in FIG. 1a. A retaining clip 15 is then installed in a groove 15a in the bottom of the launcher 10. The retaining clip 15 prevents the bolt retainer 14 from falling out of the launcher 10. The bolt retainer 14 has a necked down section 14a that prevents the attachment bolt 11 from falling out of the launcher 10 when the launcher 10 is not attached to the aircraft. The bolt retainer 14 has a hole 14b in it that allows a load crew to access a hex recess 11c (hex head 11c) in the head 11b of the attachment bolt 11 with a hex drive during installation of the LAU-129 launcher 10 on the aircraft. The bolt retainer 14 does not prevent the bolt 11 from loosening in any way.

The attachment bolt 11 has a locking element 13 disposed in threads 11a of the bolt 11. The material from which the conventional locking elements 13 are made is typically a heavy-duty nylon plastic material. Typical locking elements 13 are made by manufacturers such as Ny-Lock or Vespel, for example. The locking element 13 provides a frictional interference with a threaded receptacle (not shown, but which surrounds the threaded portion of the bolt 11) in the aircraft that prevents the bolt 11 from coming loose. The problem with this type of locking element 13 is that it is limited to 10–15 installations before it is worn out and there is no way to visually verify that the locking element 13 is working properly. Consequently, attachment bolts 11 may be installed with potentially defective locking elements 13 which could result in loosening of the bolt 11 during flight.

Figure 2:
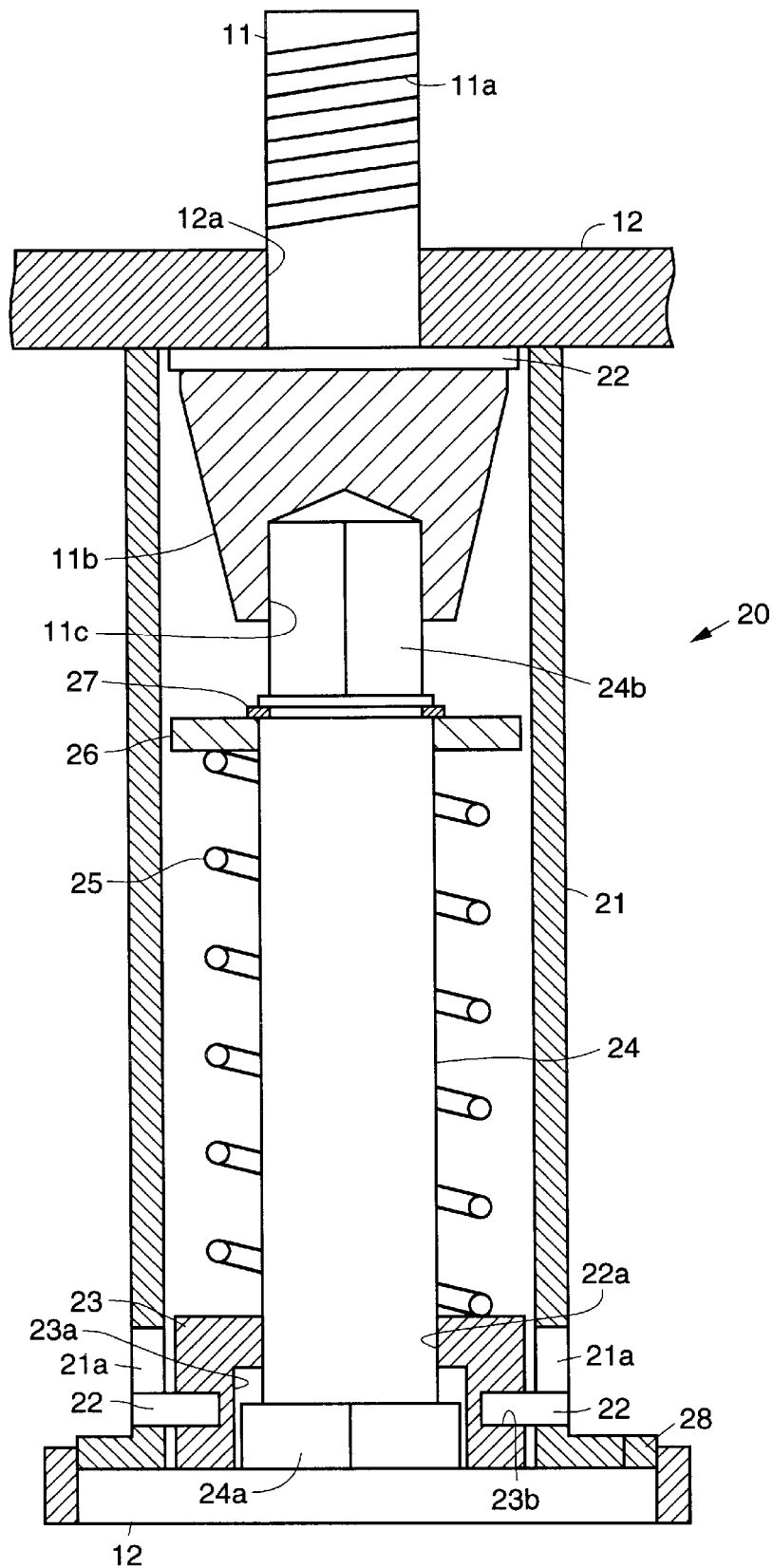
FIG. 2 a partial cross sectional view of a launcher attachment bolt locking assembly in accordance with the principles of the present invention.

Referring now to FIG. 2, it is a partial cross sectional view that illustrates an improved attachment bolt locking assembly 20 in accordance with the principles of the present invention. The attachment bolt locking assembly 20 is disposed in the same location and occupies substantially the same space available as the currently used bolt retainer 14 employed in the launcher 10 shown in FIG. 1. Each attachment bolt locking assembly 20 is coupled to an attachment bolt 11 disclosed with reference to FIG. 1.

The attachment bolt locking assembly 20 includes seven components. The attachment bolt locking assembly 20 comprises an outer tubular or cylindrical housing 21. An extension shaft 24 is disposed in the housing 21 and has a hex head 24a at one end and a hex-shaped end opposite or distal 24b. The hex-shaped distal end 24b is inserted into a hex-shaped opening 11c of the attachment bolt 11. The hex head 24a is adapted to receive a conventional socket (not shown) that is used to engage and disengage a twelve-point locking nut 23. The locking nut 23 has a central opening 23a surrounding the hex head 24a. Two pins 22 are inserted laterally through slots 21a in the housing 21 and into holes 23b disposed in the locking nut 23.

A spring 25 is disposed around the extension shaft 24 and one end thereof abuts a spring stop 26 disposed adjacent to the distal end 24b of the extension shaft 24 and abuts the locking nut 23 adjacent to the hex head 24a. A retaining ring 27 is disposed along the extension shaft 24 between the spring stop 26 and the hex-shaped distal end 24b of the extension shaft 24.

The housing 21 is keyed to the launcher rail 12 by means of a small boss 28 on a bottom edge of the housing 21. The housing 21 cannot rotate once it is installed in the launcher 10 because of the boss 28. The two pins 22 fit in the slots 21a in the housing 21 and engage the locking nut 23. The pins 22 allow the locking nut 23 to move up and down (axially) relative the housing 21, but do not allow the locking nut 23 to rotate.

The locking nut 23 engages the hex head 24a (a ⅝" hex head, for example) on the extension shaft 24 preventing the extension shaft 24 from rotating. The extension shaft 24 engages the attachment bolt 11. This prevents the attachment bolt 11 from rotating. The spring 25 forces the locking nut 23 to stay engaged with the hex head 24a of the extension shaft 24 until a socket (not shown) is pushed over the hex head 24a of the extension shaft 24. When this occurs the locking nut 23 disengages from hex head 24a of the extension shaft 24, allowing the extension shaft 24 to be rotated. This in turn allows the attachment bolt 11 to be tightened or loosened. When the socket is removed from the hex head 24a of the extension shaft 24, the locking nut 23 is forced by the spring 25 to engage the hex head 24a of the extension shaft 24, thus preventing rotation of the attachment bolt 11.

The spring stop 26 and retaining ring 27 are used to provide surfaces for the spring 25 to push against and to allow the attachment bolt locking assembly 20 to be easily assembled. The spring stop 26 and retaining ring 27 are not part of the direct locking path.

A functioning stereolithographic (plastic) model of the attachment bolt locking assembly 20 was manufactured and was installed in a LAU-129 launcher manufactured by the assignee of the present invention. This demonstrates that the attachment bolt locking assembly 20 fits in the LAU-129 launcher as designed. A metal version of the attachment bolt locking assembly 20 has also been manufactured to reduce an operable version of the present invention to practice.

The attachment bolt locking assembly 20 mechanically locks the attachment bolt 11, thus preventing it from coming loose during flight as a result of vibration. The attachment bolt locking assembly 20 uses a mechanical locking device (the locking nut 23 and pins 22) that is visually verifiable. The attachment bolt locking assembly 20 permits hundreds of installations and removals without degradation of its ability to lock the attachment bolt 11. The attachment bolt locking assembly 20 also provides a visual indication that the attachment bolt 11 is fully engaged.

To compare the conventional locking device to the attachment bolt locking assembly 20 of the present invention, the number of installations for the conventional locking device is from 10–15, while the locking assembly 20 permits over 250. The locking assembly 20 permits visual indication of lock, while the conventional locking device does not. The locking assembly 20 permits visual indication of bolt position, while the conventional locking device does not.

The attachment bolt locking assembly 20 disclosed herein was specifically designed for use with an AMRAAM LAU-129 launcher 10. However, the attachment bolt locking assembly 20 may be adapted to other applications where prevention of bolt or nut loosening is critical and installation and removal is frequent, such as automobile lug nuts, for example.

Thus, an improved locking assembly has been disclosed, and in particular one that may be used with missile launchers, and other devices that experience vibration. It is to be understood that the described embodiment is merely illustrative of some of the many specific embodiments that represent applications of the principles of the present invention. Clearly, numerous and other arrangements can be readily devised by those skilled in the art without departing from the scope of the invention.

What is claimed is:

1. An attachment bolt locking assembly for locking an attachment bolt comprising:

a housing;

an extension shaft disposed in the housing that has a hex head at one end and a hex-shaped opposite end, and wherein the hex-shaped opposite end is inserted into a hex head of the attachment bolt;

a locking nut having a opening that surrounds the shaft and hex head of the extension shaft, and wherein the locking nut engages the hex head of the extension shaft and prevents the extension shaft from rotating, and wherein the hex head of the extension shaft is configured to receive a socket that is used to engage and disengage the locking nut;

a pin disposed through a slot in the housing and into a hole disposed in the locking nut which allows the locking nut to move axially relative the housing, but prohibits the locking nut to rotate;

a spring stop disposed adjacent to the opposite end of the extension shaft;

a spring is surrounding the extension shaft having one end abutting the spring stop and having its other end abutting the locking nut;

a retaining ring disposed along the extension shaft between the spring stop and the hex-shaped distal end of the extension shaft that retains the spring stop on the shaft.

2. The locking assembly of claim 1 further comprising a boss formed at an edge of the housing which prohibits the housing from rotating.

3. The locking assembly of claim 1 further comprising a plurality of pins disposed through a plurality of slot in the housing and into a plurality of holes disposed in the locking nut.

4. An attachment bolt locking assembly for use in locking an attachment bolt to a missile launcher, said assembly comprising:

a housing adapted to be disposed in the missile launcher;

an extension shaft disposed in the housing that has a hex head at one end and a hex-shaped opposite end, and wherein the hex-shaped opposite end is inserted into a hex head of the attachment bolt;

a locking nut having a opening that surrounds the shaft and hex head of the extension shaft, and wherein the locking nut engages the hex head of the extension shaft and prevents the extension shaft from rotating, and wherein the hex head of the extension shaft is configured to receive a socket that is used to engage and disengage the locking nut;

a pin disposed through a slot in the housing and into a hole disposed in the locking nut which allows the locking nut to move axially relative the housing, but prohibits the locking nut from rotating;

a spring stop disposed adjacent to the opposite end of the extension shaft;

a spring is surrounding the extension shaft having one end abutting the spring stop and having its other end abutting the locking nut;

a retaining ring disposed along the extension shaft between the spring stop and the hex-shaped distal end of the extension shaft that retains the spring stop on the shaft.

5. The locking assembly of claim 4 further comprising a boss formed at an edge of the housing which prohibits the housing from rotating.

6. The locking assembly of claim 4 further comprising a plurality of pins disposed through a plurality of slot in the housing and into a plurality of holes disposed in the locking nut.

* * * * *